(12) United States Patent
Strader

(10) Patent No.: US 11,260,891 B2
(45) Date of Patent: Mar. 1, 2022

(54) WATER HEATER ARTICULATION TOOL

(71) Applicant: John W. Strader, Las Vegas, NV (US)

(72) Inventor: John W. Strader, Las Vegas, NV (US)

( * ) Notice: Subject to any disclaimer, the term of this patent is extended or adjusted under 35 U.S.C. 154(b) by 897 days.

(21) Appl. No.: 15/618,350

(22) Filed: Jun. 9, 2017

(65) Prior Publication Data

US 2018/0354403 A1 Dec. 13, 2018

(51) Int. Cl.
*B62B 3/10* (2006.01)
*F24H 1/06* (2022.01)
*B62B 3/08* (2006.01)

(52) U.S. Cl.
CPC .............. *B62B 3/104* (2013.01); *B62B 3/08* (2013.01); *F24H 1/06* (2013.01); *B62B 2203/10* (2013.01); *B62B 2206/06* (2013.01)

(58) Field of Classification Search
CPC ....... B66F 9/07504; B62B 3/104; B62B 3/08; B62B 2203/10
See application file for complete search history.

(56) References Cited

U.S. PATENT DOCUMENTS

| | | | |
|---|---|---|---|
| 2,385,514 A | 9/1945 | Hawkins | |
| 2,439,581 A | 4/1948 | Robins | |
| 2,820,643 A | 1/1958 | Cohn | |
| 3,941,399 A | 3/1976 | Peters et al. | |
| 4,653,765 A * | 3/1987 | Smalley | B62B 3/104 280/47.2 |
| 6,799,769 B2 | 10/2004 | Ziolkowski | |
| 7,740,251 B2 | 6/2010 | Simmons | |
| 8,226,093 B1 | 7/2012 | Gilreath | |
| 8,262,108 B2 | 9/2012 | Al-Hasan | |
| 9,283,973 B1 * | 3/2016 | Stone | B60P 1/283 |
| 9,550,506 B2 | 1/2017 | Nikora | |
| 9,580,096 B2 | 2/2017 | Beaver et al. | |
| 2007/0191197 A1 * | 8/2007 | Vittone | A63B 21/04 482/121 |
| 2011/0052356 A1 * | 3/2011 | Leatherman | B62B 1/14 414/444 |
| 2015/0329337 A1 * | 11/2015 | Ziaylek | B65G 7/00 414/622 |

* cited by examiner

*Primary Examiner* — Saul Rodriguez
*Assistant Examiner* — Willie Berry, Jr.
(74) *Attorney, Agent, or Firm* — Hall Estill Law Firm

(57) ABSTRACT

A tool can aid in articulating a water heater onto, and off of, an elevated pedestal. The tool can consist of at least a frame that is pivotally attached to a stationary base via a fulcrum feature. The frame may be sized to support a water heater with at least a pair of rails. The stationary base can have at least one rigid pivot stop cantilevered from a base body and shaped to maintain the stationary base at a non-normal tilted orientation.

19 Claims, 5 Drawing Sheets

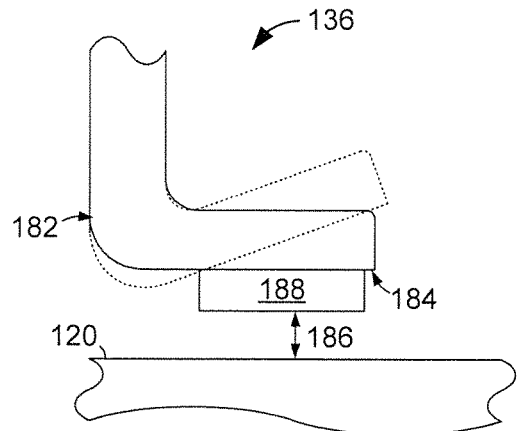
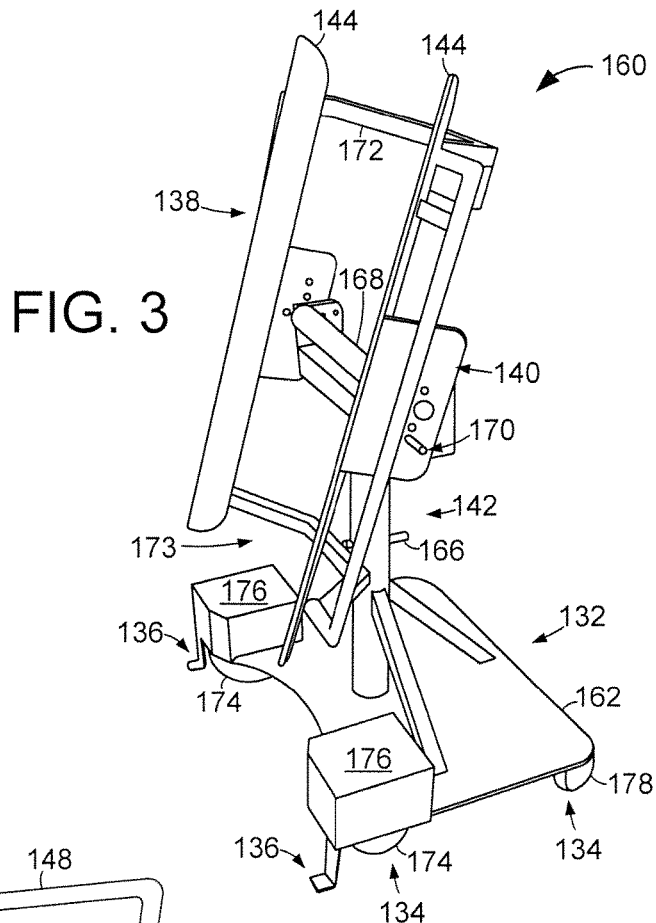
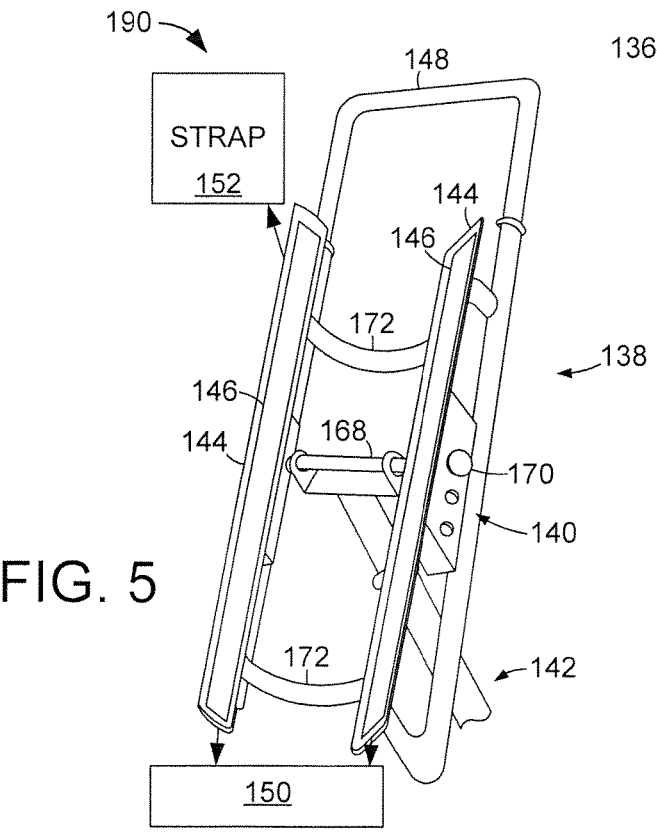

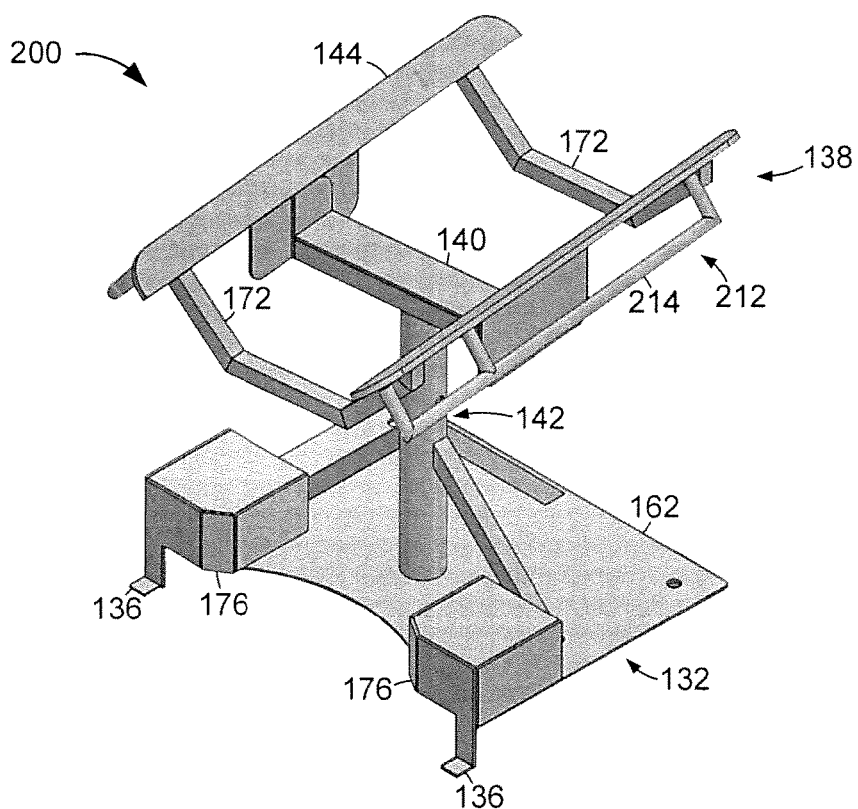

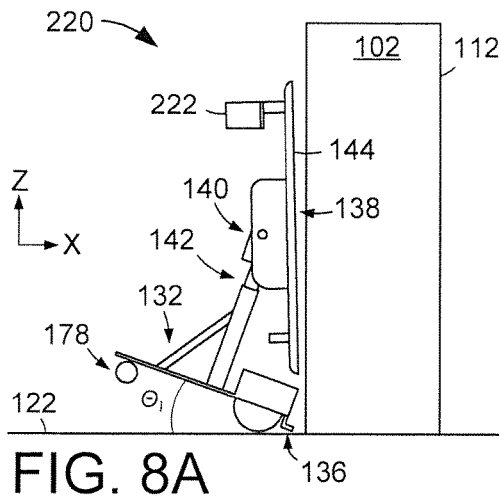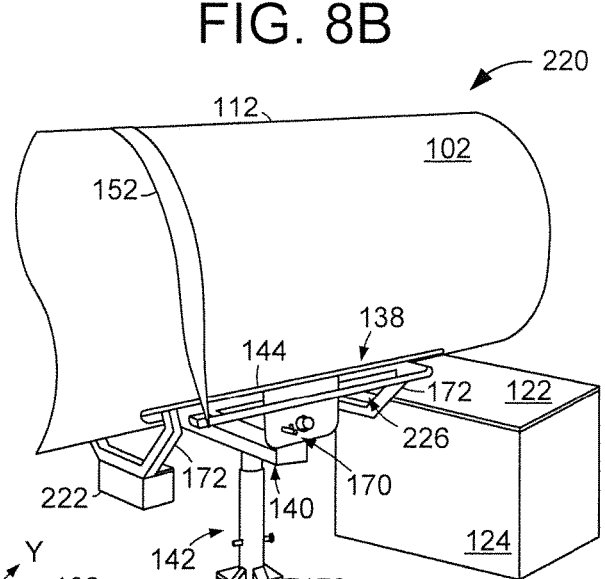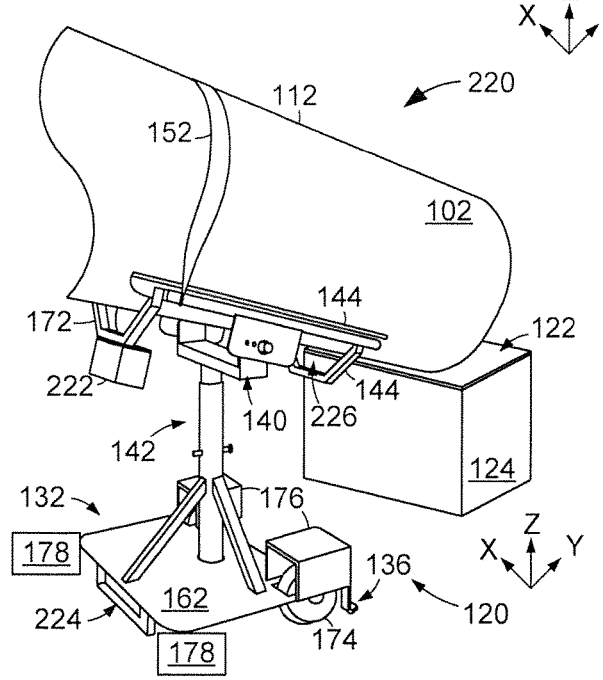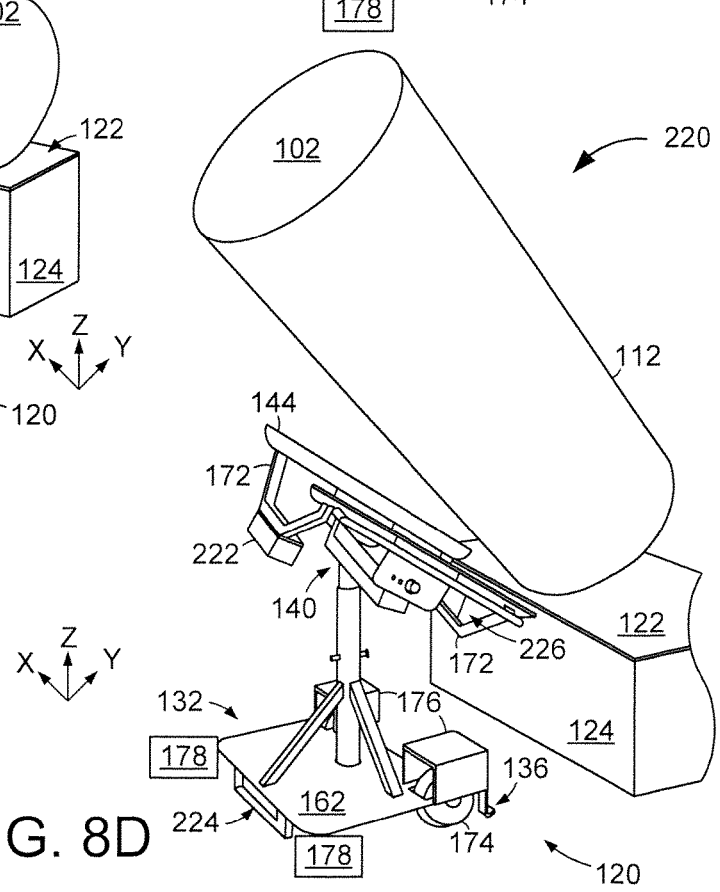

WATER HEATER ARTICULATION TOOL

SUMMARY

A water heater tool, in accordance with some embodiments, has a frame that is pivotally attached to a base via a fulcrum feature. The frame is sized to support a water heater with a pair of rails. The base has at least one rigid pivot stop cantilevered from a base body and shaped to maintain the base at a non-normal tilted orientation when contacting a ground surface.

BRIEF DESCRIPTION OF THE DRAWINGS

FIG. 3 is a line representation of an example water heater articulation tool configured in accordance with some embodiments.

FIG. 4 conveys a portion of an example water heater articulation tool operated as part of the water heater system of FIG. 1.

FIG. 5 shows a portion of an example water heater articulation tool arranged in accordance with some embodiments.

FIG. 6 illustrates a portion of an example water heater articulation tool that may be employed in the water heater system of FIG. 1.

FIG. 7 shows an exploded view line representation of an example water heater articulation tool capable of being employed with the water heater system of FIG. 1.

FIGS. 8A-8D respectively illustrate portions of an example water heater articulation tool constructed and operated in accordance with assorted embodiments.

DETAILED DESCRIPTION

A water heater, and other cylindrical structures, can be difficult to maneuver and install. The relatively delicate aspects of a water heater make aggressive handling and industrial tools less than ideal manners to relocate a water heater. In the past, one or more people have moved a water heater by hand with simple tools, such as rope and straps. However, the use of manpower can be unpredictable, unreliable, and inefficient in terms of the time, safety, and cost involved with installing a water heater.

Accordingly, various embodiments are generally directed to a water heater articulation tool that can maneuver and install a water heater with minimal manpower and precision that protects the delicate portions of the water heater. By utilizing a pivoting frame that can lock to a fulcrum feature while a stationary base tilts relative to ground level, a water heater can be lifted to an elevated pedestal, which has a height above ground level required by code, without concern for trauma or damage to the housing or gas valve portions of the water heater. The utilization of the pivoting frame further allows physically larger water heaters to be more safely and efficiently moved, articulated, and installed to elevated positions.

Figure 1:
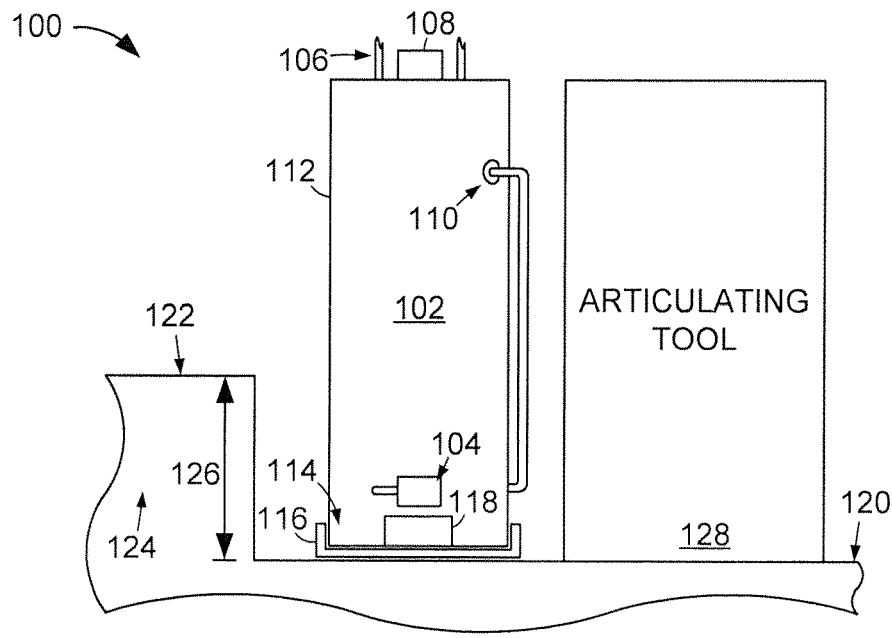
FIG. 1 represents an example water heater system in accordance with various embodiments.

FIG. 1 displays an example water heater system 100 in which various embodiments can be practiced. A water heater 102 is shown in a non-limiting configuration where a gas valve 104, water piping 106, vent 108, and pressure relief piping 110 are all external to a cylindrical body 112. A base 114 of the cylindrical body rests in a separate, non-combustible pan 116, which is displayed as a cross-section to reveal the pilot port 118 of the water heater where a flame is manually, or automatically, kept.

In many industrial, commercial, and residential sites, the water heater 102 is required to be elevated above ground level 120 by code. Such elevation can prevent accumulated fluids and/or gases from igniting when exposed to the flame resident in the pilot port 118 and burner assembly positioned in the pilot port 118. Hence, installation of the water heater 102 necessitates articulating the pan 116 and water heater 102 onto a top surface 122 of a pedestal 124 elevated a predetermined distance 126 above ground level 120, such as, but not limited to 18" required by building code(s). While the use of manpower can be utilized to articulate the water heater 102, an articulating tool 128 can, in accordance with various embodiments, be configured to safely and efficiently engage, move, lift, and install the water heater 102 onto the elevated pedestal 124.

Figure 2:
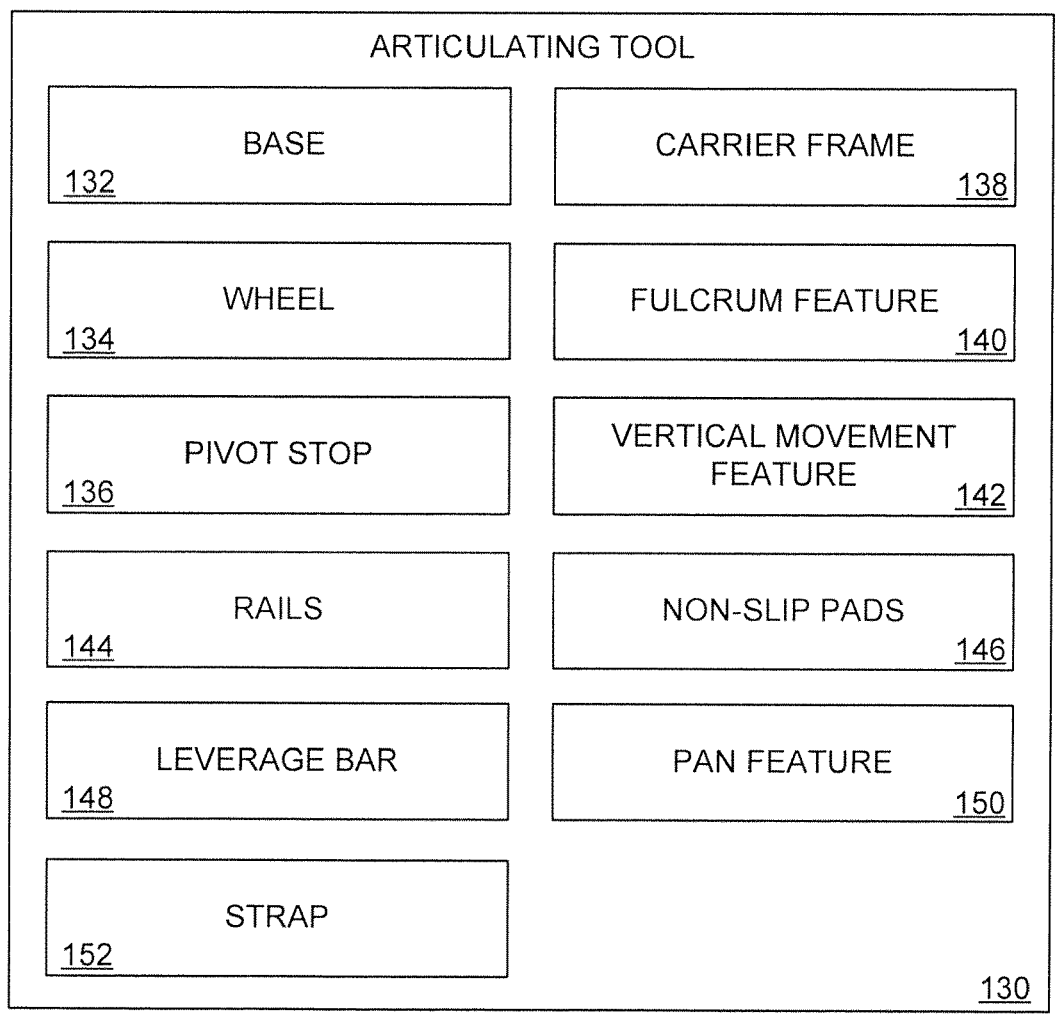
FIG. 2 displays block representation of an example water heater articulation tool that can be used in the water heater system of FIG. 1.

FIG. 2 conveys a block representation of an example articulating tool 130 that can be utilized in the water heater system 100 in accordance with assorted embodiments. The tool 130 has a base 132 that can consist of base body and a vertical support. Two caster wheels 134 and two larger fixed wheels can be attached to the stationary base 132 to allow movement of the stationary base while the base body remains parallel to a ground level.

At least one pivot stop 136 can extend from the base body in a cantilevered configuration that allows the base to tilt only a predetermined amount relative to a ground level. That is, a pivot stop 136 can extend from the base body to allow the base 132 to pivot on at least one wheel 134 until the pivot stop 136 contacts the ground level to prevent further tilting of the base 132. It is contemplated that multiple pivot stops 136 can be separately positioned around the base body to provide tool 130 stability while tilted relative to the ground level.

The base 132 can attach to a carrier frame 138 via a fulcrum feature 140 that allows rotation of the frame 138 relative to the fulcrum feature 140 and underlying stationary base 132. The fulcrum feature 140 can lock the carrier frame 138 in multiple different positions, which allows of efficient loading, articulation, and unloading of a water heater, such as heater 102 of FIG. 1. The base 132 may have a vertical movement feature 142 that selects a variety of different vertical positions of a carrier frame 138 and fulcrum feature 140. The vertical movement feature 142 can be manual, such as a pinned connection, or automatic, such as a piston that is mechanically, hydraulically, or pneumatically powered.

The carrier frame 138 has at least two separate rails 144 connected via a frame support structure. The rails 144 can be configured to physically contact the water heater with non-slip pads 146 that can be one or more different materials, such as rubber or mat, that reduce slippage of the water heater during movement and rotation of the frame 138 about the fulcrum feature 140. Such rotation may be assisted by a leverage bar 148 that can selectively extend from the frame support structure to make water heater tilting easier. The leverage bar 148 may be removable or manipulated by a user to control the effort and precision of water heater/frame rotation.

A non-combustible pan feature 150 can be attached to, or integrated into the carrier frame 138 to secure the pan 116 about the base of the water heater. The pan feature 150 can consist of one or more tension members, such as a spring, strap, or magnet, that can be selectively attached to, and removed from, a pan to maintain the pan in position relative to the carrier frame 138 and water heater. In some embodiments, the water heater is secured to the carrier frame 138 via one or more straps 152, such as quick release straps, that can mount to, or extend from, the frame support structure.

FIG. 3 illustrates a line representation of an example articulation tool 160 arranged in accordance with some embodiments. It is noted that various reference numbers from FIGS. 1-2 will be used in other drawings, but such reference numbers are in no way limiting to the possible configurations of the embodiments shown in the respective drawings. In FIG. 3, the base 132 has a base body 162 that can be a substantially flat plate to which the wheels 134 and vertical movement feature 142 attach. Multiple vertical supports 164 can secure the vertical movement feature 142 in place and provide rigidity for supporting a water heater with the fulcrum feature 140 and carrier frame 138.

While a manual pinned connection 166 is depicted in FIG. 3 as the means for raising the fulcrum feature 140 and carrier frame 138 relative to the stationary base 132, such arrangement is not required or limiting. The fulcrum feature 140 has a central shaft 168 that connects to the carrier frame 138 via a pinned connection 170 to allow the frame 138 to be rotated and locked to various orientations relative to the fulcrum feature 140 and stationary base 132. It is noted that the pinned connection 170 can consist of at least one locking pin that may be attached to the carrier 138, such as via a flexible or rigid chain, string, or band. The central shaft 168 may contact the carrier frame 138 via friction contact or via one or more bearings.

The carrier frame 138 has a support structure 172 that is configured to accommodate a water heater specifically. That is, the support structure 172 has a shape and size that presents the rails 146, supports any straps 154, and accommodates various water heater aspects. As a non-limiting example, the support structure 172 can define a valve aperture 173 that can be occupied by a gas valve of a water heater without placing stress or trauma on the valve when the water heater is inserted, articulated, and removed from the frame 138. The support structure 172 may further accommodate other water heater features, like relief piping and pilot port, by orienting the water heater in a particular orientation where the gas valve occupies the valve aperture 173.

The base body 162 is arranged with different types of movement means. Although not required or limiting, a pair of fixed wheel 174 movement means can be attached to opposite sides of a common edge of the base body 162. It is contemplated that smaller diameter fixed wheels 174 can be unstable and inefficient to move, particularly when heavy and/or high center-of-gravity items are being moved by the tool 160. Hence, various embodiments provide relatively large diameter fixed wheels 174, such a greater than 5" diameter, that optimally maneuver over terrain with varying elevations and roughness with enhanced safety. The larger diameter fixed wheels 174 are protected from trauma by wheel hubs 176 portions of the base body 162.

The wheel hubs 176 respectively provide a mounting point for pivot stops 136 that extend towards ground level. The pivot stops 136 can be configured to provide a rigid contact between the articulation tool 160 and the ground level 120 that allows the base 132 and carrier frame 138 to safely pivot to ease the engagement and/or installation of a water heater. The large diameter fixed wheel movement means 174 may alternatively tilt and/or rotate to allow the base 132 to be steered. However, some embodiments provide steering for the tool 160 via caster 178 movement means positioned on opposite sides of a common edge, opposite the fixed wheels 174. By positioning casters 178 opposite the fixed wheel 174 movement means with smaller diameters than the respective fixed wheels 174, the articulation tool 160 can be efficiently rotated in-place or steered with optimized balance and terrain navigation capability.

FIG. 4 depicts a cross-sectional line representation of an example pivot stop 136 that can be utilized as part of an articulation tool in accordance with various embodiments. The pivot stop 136 can be a single piece of material, as shown, or an assembly of multiple pieces. The pivot stop 136 is shaped with a turn 182 that presents a pivot surface 184 substantially parallel to ground level 120 when not contacting the ground level 120. That is, the pivot stop 136 has at least one turn that provides a pivot surface 184 proximal to ground level 120, but separated from ground level 120 by a set separation distance 186 when the base body 162 of the tool is substantially parallel to the ground level 120.

It is contemplated that the pivot stop 136 has a turn of greater than 90 degrees, as illustrated by segmented lines, in which a pivot surface would be in a non-zero angled orientation with the ground level 120. Such a non-zero pivot surface angle can be tuned for angular orientation and proximity to the ground level 120 to customize the stability and ease of pivoting engagement of the articulation tool. In some embodiments, a different material is attached to the pivot surface 184 in the form of a pivot pad 188. For instance, a rubber, felt, or plastic that can aid in pivot stability and/or reduce wear on the ground surface being pivoted upon.

A line representation of an example articulation tool 180 is displayed in FIG. 5. The tool 190 conveys how a leverage bar 148 can slidingly engage the carrier frame 138 to allow a user to selectively extend the bar 148 to ease rotation of the carrier frame 138 about the fulcrum feature 140. Each rail 144 is shown with a non-slip pad 146 that may extend to cover some, or all, of the rail 144 to reduce the risk of a water heater moving independently of the carrier frame 138.

A pan feature 150 is generally conveyed as a block extending from the respective rails 144. The pan feature 150 may consist of one or more components capable of continuously applying pressure onto a pan towards a water heater to hold the pan in-place during movement, tilting, and installation of the water heater onto an elevated pedestal. As a non-limiting example, the pan feature 150 comprises selectable clips that can attach to a pan and elastic cords that independently draw the clips towards the rails 144.

A strap assembly 152 is also conveyed in FIG. 5 in block fotin. A strap is meant to denote an attachment means that is selectable by a user. Hence, the strap assembly 152 can be one or more components that connect the carrier frame 138 to a water heater, such as string, elastic bands, or a ratcheting strap. In the event a ratcheting strap is employed, the carrier frame 138 may consist of mounting locations for the ratcheting aspects, such as on a support structure 172, and strap routing guides in the rails 144 to prevent wear and trauma on the strap. It is contemplated that the carrier frame 138 can be configured to concurrently support multiple strap assemblies 152 that may, or may not, be the same type of attachment means.

FIG. 5 is a line representation of a portion of an example articulation tool 200 where the carrier frame 138 is rotated to a substantially horizontal orientation relative to ground level 120. The rotation of the carrier frame 138 allows different aspects of the tool 200 to be illustrated compared to FIGS. 3 & 5 where the carrier frame 138 was positioned more vertically. It is noted that the vertical movement feature 142 may consist of any type of vertically actuating means. For instance, a mechanical connection, such as a pin extending through a telescoping pole, a hydraulic connection, such as a hand, foot, or motor pumped jack, or a pneumatic piston can be incorporated into the articulation tool 200 as part of the vertical movement feature 142.

In FIG. 7, a partially exploded view of a portion of an example articulation tool 210 is displayed. The exploded view of FIG. 7 illustrates how assorted pieces can be positioned to provide safe and efficient water heater engagement, movement, and installation. It is noted that each rail 144 may be configured with a handle 212 that has a tube 214 separated from the rail 144 by a standoff 216. The tube 214 can be ergonomically arranged to optimize control of the articulation tool 210 with a loaded water heater while providing greater safety than if small, or no, handles were incorporated into the carrier frame 138.

FIGS. 8A-8D respectively display line representations of an example water heater system 220 that can utilize the various embodiments of FIGS. 1-7 to efficiently and safely install a water heater 102 onto an elevated pedestal 124. In FIG. 8A the water heater 102 is shown being engaged by the carrier frame 138 before being moved proximal the elevated pedestal 124. Prior to contacting the water heater 102, the base 132 is tilted to a predetermined angle $\theta_1$ relative to the ground level 120 that is secured by the pivot stop(s) 136 contacting the ground level 120 while the movement means 178 are separated from the ground level.

By tilting the base 132, the carrier frame 138 and rails 144 rotate about the fulcrum feature 140 to be substantially vertical (perpendicular to the ground level 120) to match the sidewall shape of the heater housing 112. If the pivot stops 136 did not secure the base 132 in a tilted orientation, the base 132 to impact the water heater 102 and cause damage while making attaching the water heater 102 to the carrier frame 138 much more difficult. It is noted that the orientation of the carrier frame 138 to the fulcrum feature 140, and base 132, can be secured by a pinned connection that prevents the carrier frame 138 from rotating about the fulcrum feature 140 during engagement with the water heater 102.

FIG. 8B displays the water heater 102 being lifted to a height that is conducive to placement on the elevated pedestal 124. It is noted that the carrier frame 138 has been rotated about the fulcrum feature 140 into a substantially horizontal position (parallel to ground level 120), which makes moving the base 132 to a position proximal the pedestal 124 easier and safer. The rotation of the carrier feature 138 is conducted after any pinned connections between the fulcrum feature 130 and carrier frame 138 have been removed. It is contemplated that the carrier frame 138 is free to rotate about the fulcrum feature 130 after the water heater 102 is mounted to the rails 144, as shown in FIG. 8A.

With the carrier frame 138 being free to rotate, the water heater 102 is secured to the rails 144 by the strap 152 that continuously extends about the water heater 102 to a ratcheting assembly 222 that is rigidly attached to the support structure 172 of the carrier frame 138. The non-limiting embodiment shown in FIG. 8B illustrates how the ratcheting assembly 222 is affixed to a plate that evenly distributes force to the support structure 172 to increase the rigidity and security of the strap 152. The carrier frame 138 may be in any angular orientation relative to the base 132, but in some embodiments, is transported with the longitudinal axis of the water heater 102 substantially parallel to ground level 120 and while the orientation of the water heater 102 and carrier frame 138 is fastened by the pinned connection 170 to the fulcrum feature 140.

FIG. 8B conveys how the base 132 is positioned with the pivot stops 136 facing the elevated pedestal 124, as steered by the movement means 178, such as a caster, ball bearing, or rotating wheel. Movement of the water heater 102 may be aided by a pivot bar 224 that can engage a user's foot. It is contemplated that the water heater 102 is vertically raised along the Z axis with the vertical movement feature 142 while the water heater 102 is in the horizontal position shown in FIG. 8B.

It is noted that the support structure 172 of the carrier frame 138 is arranged with a valve aperture 226 that can accommodate at least a gas valve portion of the water heater 102, which sticks out beyond the cylindrical extent of the water heater housing 112. By accommodating the gas valve with the valve aperture 226, the water heater 102 can continuously engage each rail 144 and safely endure light vibrations, blunt force, and jostling that can occur during movement of the base 132 and frame 138.

With the position of the water heater 102 located proximal the elevated pedestal surface 122, the relatively delicate housing 112 and cylindrical shape of the water heater 102 can make placement on the pedestal surface 122 precarious. Hence, rotation of the carrier frame 138 is made easy with a leverage bar while stability and movement of the base 132 is made easy by the pivot bar 224. Contact of the water heater 102 and the pedestal surface 122, as shown in FIG. 8C, provides stability for the water heater 102 to be unmounted from the carrier frame 138 and rotated by hand by a user into a vertical orientation atop the elevated pedestal 124, as shown in FIG. 8D.

That is, water heater 102 contact with the pedestal surface 122 provides a securing point, which may be aided by the pivot bar 224 being engaged by the foot of user, to allow the water heater 102 to be unstrapped and tilted by hand into a vertical position, separated from the carrier frame 138. It is noted that separation of the water heater 102 from the carrier frame 138 allows the carrier frame to freely rotate about the fulcrum feature 140 into a substantially vertical orientation, which prevents the rails 144 from interfering with the by-hand rotation of the water heater 102 into a vertical orientation on the pedestal 124.

Accordingly, the water heater 102 can be taken from nearly any position off the pedestal 124 and installed in a vertical orientation atop the pedestal surface 122 by a single person utilizing the capabilities of the articulation tool. While the rails 144 of the carrier frame 138 can be configured to accommodate various portions of the water heater 102, such as the gas valve 104 and relief piping 110, a static pair of rails may not be optimal for every water heater 102. For instance, water heaters 102 with of different sizes and/or custom shapes can fit awkwardly between the frame rails 144, which can increase the risk of instability and other safety issues during movement and installation.

Thus, some embodiments construct the frame rails 144 to allow for expansion components that change the overall profile of the rails 144 to better contact and secure water heaters 102 of varying sizes and shapes. As a non-limiting example, the expansion components can extend outwardly from the rails 144 with a continuously curvilinear shape that contact more surface area of a water heater housing 112 than the static rails 144 shown in FIGS. 3-8D. The expansion components may be rigid or flexible and may hinge relative to the carrier frame 138 to provide stability and secure contact between the water heater 102 and frame 138.

Any number of expansion components can be selectively installed, and removed, from the carrier frame 138 at any time by a user. The expansion component(s) can attach to the rails 144 and/or carrier frame 138 via one or more attachment features, such as a swage joint, keyed groove, or press-fit. While not required or limiting, the attachment feature may be a fastener, such as a screw, or mechanical connection, such as a tongue-and-groove or dove-tail interconnection. Regardless of the arrangement of the expansion component(s) or the attachment means of the component(s) to the rails 144 and/or carrier frame 138, the ability to selectively alter the shape/size of the carrier frame rails 144 allows the articulation tool to safely and efficiently handle and install a diverse variety of water heaters.

Figure 9:
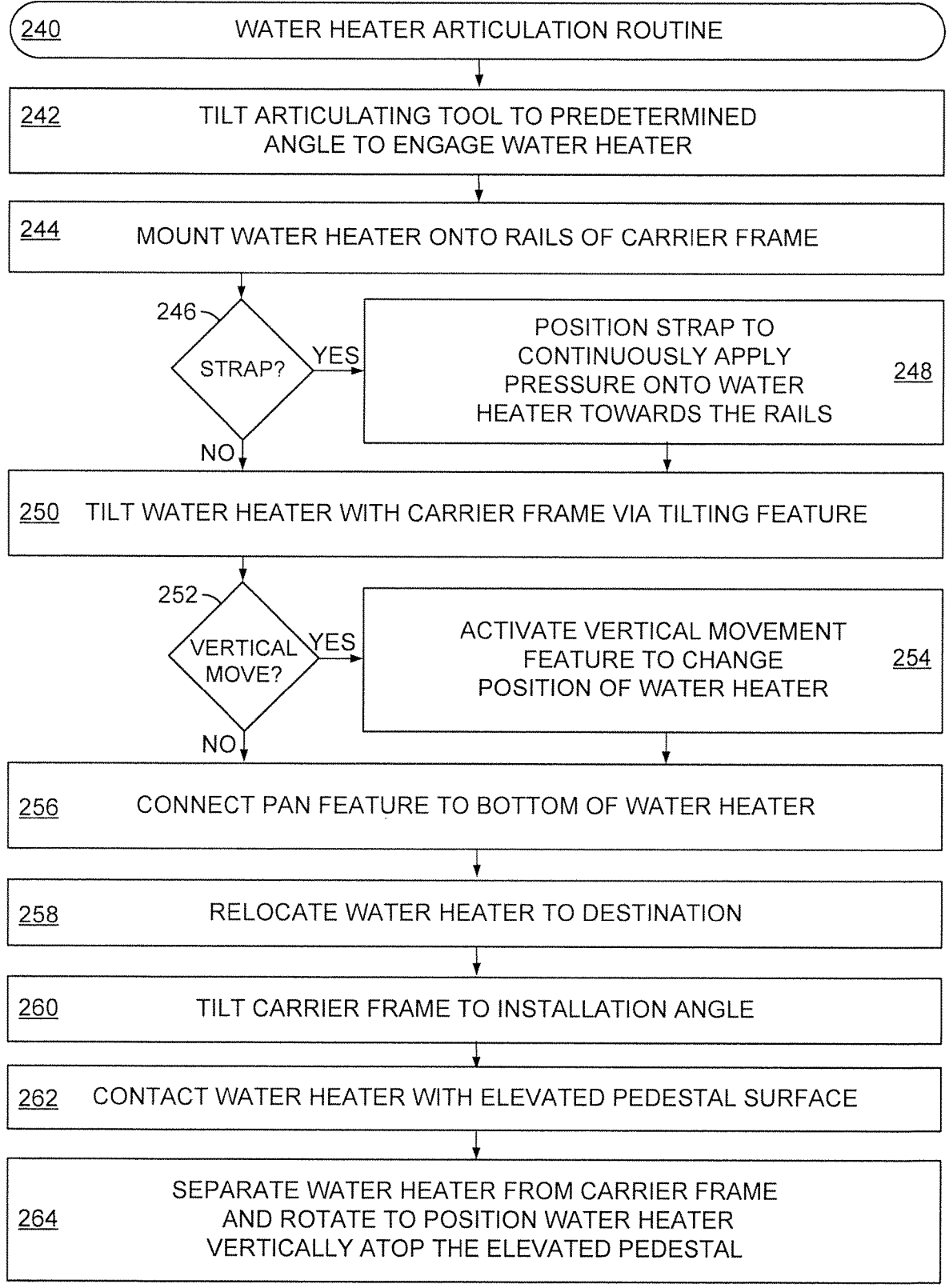
FIG. 9 is a water heater articulation routine that is executed with the water heater articulation tools of FIGS. 1-8D.

FIG. 9 is a flowchart of an example water heater articulation routine 240 that can be carried out in accordance with various embodiments to install, or remove, a water heater from an elevated pedestal. Initially, the articulation tool is assembled with wheels attached to a base, a vertical movement feature attached to the base, a fulcrum feature attached to the vertical movement feature, and a carrier frame attached to the fulcrum feature. It is understood that the assembled articulation tool can consist of a pan feature, rail extension components, and one or more straps.

With the articulation tool assembled, step 242 tilts the tool until the pivot stops contact ground level, as shown in FIG. 8A, and proceeds to physically engage the water heater. That is, the water heater in step 242 can be in any position and orientation that can be accommodated by moving the base, vertical movement feature, and carrier frame. It is noted that some embodiments articulate the water heater prior to engagement with the carrier frame to orient a gas valve and/or exterior relief piping to face the carrier frame in order to fit within a valve aperture portion provided by the frame support structure.

During step 242, the carrier frame's position is locked to the fulcrum feature, such as via a mechanical connection with the fulcrum feature or stationary base. It is noted that the positioning of the water heater into the carrier frame may require a specific water heater orientation where aspects of the water heater, such as the gas valve or relief piping, are positioned to minimize contact and trauma with the frame rails during movement and water heater installation.

The physical engagement of the rails to the water heater in step 244 prompts decision 246 to determine if one or more straps are to be used to secure the water heater to the carrier frame. If so, step 248 positions strap(s) to continuously apply pressure onto the water heater in a direction towards the rails. At the conclusion of step 248, or if no strap is to be used from decision 246, step 250 tilts the carrier frame into a substantially horizontal orientation, as shown in FIG. 8B, with the carrier frame being unpinned and free to rotate about the fulcrum feature.

A horizontal water heater orientation relative to ground level provides a safe and secure configuration to vertically raise the carrier frame via the vertical movement feature of the articulation tool. Decision 252 evaluates the need for vertical movement and executes step 254 if the water heater's position is too low to engage an elevated pedestal surface. Such vertical adjustment in step 254 can be made manually, via a pinned connection, or automatically via hydraulic and/or pneumatic support.

With the water heater locked in the correct horizontal position via the locking pin of the pinned connection 170, step 256 then connects a pan feature to the bottom of the water heater. Step 256 may involve securing the pan feature to the carrier frame, base, or water heater itself. Next, step 258 relocates the water heater and articulation tool in close proximity to the elevated pedestal onto which the water heater is to be installed. Such position may contact portions of the base and/or carrier frame with the elevated pedestal.

With the horizontal locking pin of the pinned connection 170 removed, the carrier frame is tilted in step 260 from a horizontal configuration to an installation angle defined by contact between the water heater and the elevated surface pedestal in step 262. In other words, step 260 initiates carrier frame tilting until the water heater contacts the pedestal in step 262 with an angle that is characterized as an installation angle. It is contemplated that the installation angle is non-normal, such as approximately 45 degrees. Step 264 proceeds to separate the water heater from the carrier frame by undoing any straps before rotating the water heater by hand into a vertical positon atop the elevated pedestal with the entirety of the water heater base contacting the elevated pedestal surface.

Through the various embodiments of the present disclosure, a water heater can be installed onto an elevated pedestal with increased safety and efficiency than if manual labor or non-specialized tools are employed. The articulation tool described herein provides the ability to load, secure, elevate, and install a water heater of various sizes and shapes with a single user. By positioning the water heater in a vertical orientation with the articulation tool, damage to the water heater is minimized and a pan can be efficiently positioned without lifting or tilting the water heater. Thus, the water heater articulation tool serves to satisfy industry and consumer needs by decreasing installation time and cost while improving installation safety.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed.

What is claimed is:

1. An apparatus comprising a frame pivotally attached to a stationary base via a fulcrum feature, the frame sized to support a water heater with at least a pair of rails, the stationary base having at least one rigid pivot stop cantilevered from a base body and shaped to contact a ground level and maintain the stationary base at a non-normal tilted orientation relative to the ground level, the at least one rigid pivot stop positioned to be separated from the ground level when the stationary base is oriented parallel to the ground level, each rigid pivot stop having multiple plates meeting at a greater than 45 angle with respect to the base body.

2. The apparatus of claim 1, wherein the multiple plates meet at a right angle.

3. The apparatus of claim 1, wherein a first pivot stop and a second pivot stop of the at least one rigid pivot stop are positioned on a common side of the base body.

4. The apparatus of claim 1, wherein the stationary base comprises a first, second, third, and fourth separate wheels.

5. The apparatus of claim 4, wherein the first and second separate wheels each have a fixed orientation relative to the stationary base.

6. The apparatus of claim 5, wherein a first rigid pivot stop of the at least one rigid pivot stop is positioned proximal the first wheel and distal the third and fourth wheels.

7. The apparatus of claim 4, wherein the third and fourth separate wheels each have a variable orientation with respect to the stationary base.

8. The apparatus of claim 1, wherein a stand feature is attached to the stationary base to maintain contact between each rigid pivot stop and a ground level on which at least one wheel of the stationary base contacts.

9. The apparatus of claim 1, wherein the fulcrum feature is attached to the stationary base via a pinned connection.

10. An apparatus comprising a frame pivotally attached to a stationary base via a fulcrum feature, the frame sized to support a water heater with at least a pair of rails defining a valve aperture sized to be occupied by a gas valve of the water heater while the water heater contacts the at least a pair of rails, the stationary base having at least one rigid pivot stop cantilevered from a base body and shaped contact a ground level and to maintain the stationary base at a non-normal tilted orientation relative to the ground level, the at least one rigid pivot stop positioned to be separated from the ground level when the stationary base is oriented parallel to the ground level, each rigid pivot stop having multiple plates meeting at a greater than 45 angle with respect to the base body.

11. The apparatus of claim 10, wherein the articulation positions the water heater and water heater pan at a greater than zero elevation above the ground level, the stationary base supported on the ground level.

12. The apparatus of claim 10, wherein the frame comprises a pan feature securing a separate water heater pan during articulation of the frame about the fulcrum feature.

13. The apparatus of claim 10, wherein the fulcrum feature is connected to the stationary base via a lift mechanism.

14. The apparatus of claim 13, wherein the lift mechanism consists of a mechanical piston, hydraulic piston, or pneumatic piston.

15. The apparatus of claim 10, wherein the frame comprises a leverage bar slidingly cantilevered from a frame support.

16. The apparatus of claim 10, wherein the frame has a plurality of pin apertures to secure multiple different frame orientation relative to the stationary base.

17. A method comprising:
attaching a frame to a stationary base via a fulcrum feature, at least one rigid pivot stop cantilevered from a base body of the stationary base attached, the at least one rigid pivot stop positioned to be separated from a ground level when the stationary base is oriented parallel to the ground level, each rigid pivot stop having multiple plates meeting at a greater than 45 angle with respect to the base body;
inserting a water heater into contact with at least a pair of rails of the frame, the at least a pair of rails sized to support a variety of different water heater circumferences;
pivoting the water heater about the fulcrum feature;
tiling the stationary base to a non-normal orientation relative to the ground level to raise the water heater an elevation above the ground level;
maintaining the non-normal orientation with the at least one rigid pivot stop being in contact with the ground level; and
removing the water heater from the frame at the elevation above ground level.

18. The method of claim 17, wherein the frame is locked relative to the fulcrum feature prior to the tilting step.

19. The method of claim 17, wherein a base of the water heater remains separated from the frame throughout the inserting, pivoting, tilting, maintaining, and removing steps.

* * * * *